Jan. 30, 1951   W. G. WILLIAMS ET AL   2,539,983
TIRE REMOVER WITH CIRCUMFERENTIALLY DELIVERED THRUST
Filed Sept. 24, 1947
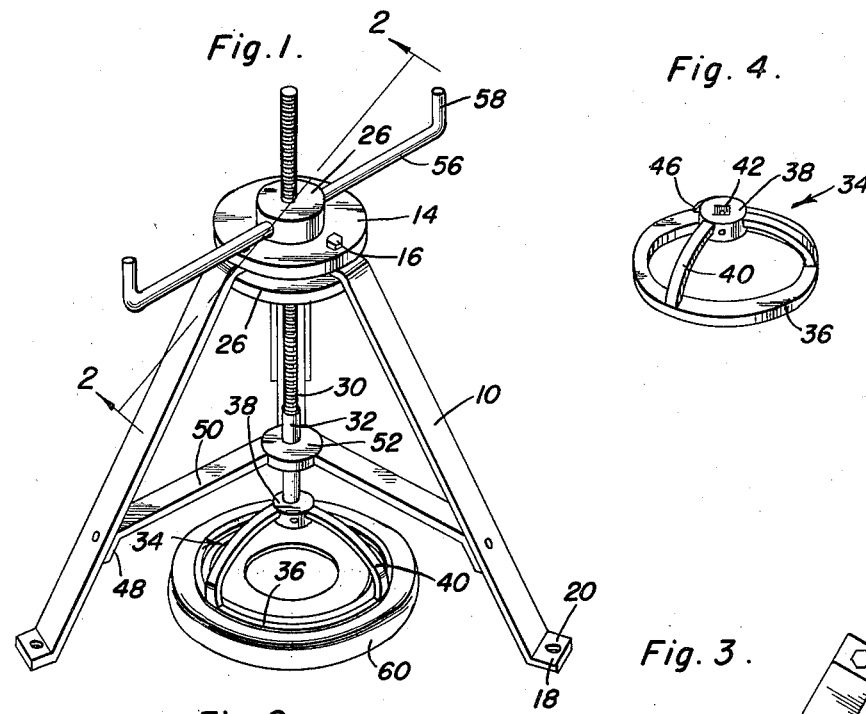
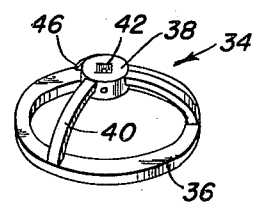
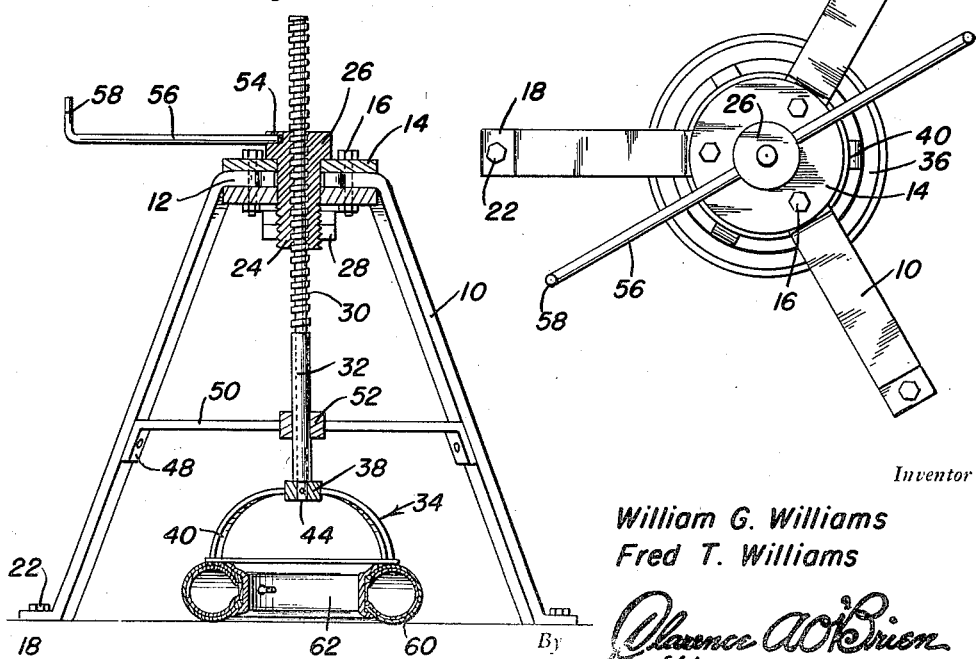
Inventor
William G. Williams
Fred T. Williams Patented Jan. 30, 1951

2,539,983

UNITED STATES PATENT OFFICE 2,539,983

TIRE REMOVER WITH CIRCUMFERENTIALLY DELIVERED THRUST

William G. Williams and Fred T. Williams, Rogue River, Oreg.

Application September 24, 1947, Serial No. 775,940

2 Claims. (Cl. 157—1.2)

This invention relates to new and useful improvements in tire removers and the primary object of the present invention is to provide a device for removing rims from pneumatic tires that have become stuck or rusted upon the rim in such a manner as to require excessive effort and force to effectively remove the rim from the tire.

Another important object of the present invention is to provide a tire remover including novel and improved feeding means for adjustably bearing upon a pneumatic tire to force the same from frictionally engaging a rim supporting the same.

A further object of the present invention is to provide a device for removing rims from tires including a novel and improved supporting stand, so designed as to afford greater rigidity to the device.

A still further aim of the present invention is to provide a tire remover that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present tire remover in use;

Figure 2 is a longitudinal vertical sectional view taken substantially on the plane of section line 2—2 of Figure 1;

Figure 3 is a plan view of Figure 1; and

Figure 4 is a perspective view of the tire engaging member.

Referring now to the drawings in detail, wherein for the purpose of illustration, there is disclosed a preferred embodiment of the present invention, the numeral 10 represents a plurality of vertically inclined upwardly converging legs having their upper terminals 12 turned inwardly to extend between a pair of annular journal rings 14. The terminals 12 of these legs are removably secured to the journal rings 14 by the use of fasteners 16.

It is preferred, that the lower terminals of the legs 10 be turned outwardly to form feet 18 having apertures 20 that engage suitable fasteners 22 for rigidly securing the legs to a supporting structure such as a floor or the like.

Journalled for rotation in the central openings in rings 14, is a sleeve 24 having an annular upper flanged portion 26 that bears upon the upper of the rings 14. The lower outer periphery of the sleeve 24 is externally threaded and receivably engages one or more retaining nuts 28 that prevent accidental loss of the sleeve during shipment of the device.

Receivably engaging the internal threads of the sleeve 24, is a feed screw 30 provided with a smooth surfaced, cylindrical extension 32.

The numeral 34 represents the tire engaging member generally, comprising a bearing ring 36, a hub 38 and arcuate braces 40 connecting the hub to the ring 36. A squared aperture 42 is provided in hub 38 and engages a lug 44 projecting outwardly from the lower terminal of extension 32. A set screw or the like 46 adjustably carried by the hub is selectively adjustable to bear against lug 44 to retain the tire engaging member in position to the extension 32. Rigidly secured to each of the legs 10 are the downwardly inclined end portions 48 of a plurality of horizontally disposed braces 50 (or arms) the free ends of which converge and are secured to a guide ring or journal bearing 52 that rotatably receives and slidably receives the extension 32.

Sockets 54 are disposed on opposite sides of the flanged portion 26 of the sleeve 24, and removably engage one terminal of a pair of lever bars 56 having their outer terminals turned upwardly to provide hand receiving portions 58.

In practical use of the device, a tire 60 having a rim 62 is disposed beneath the member 34. As the bars 56 are rotated, the feed srew is propelled downwardly so that the ring 36 of the member 34 will forcefully bear against the tire to effectively disengage the tire from the rim.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A tire remover mounted on a floor for removing a tire from a rim supported on the floor, said remover comprising a plurality of downwardly and outwardly inclined legs having inwardly turned upper end portions, upper and lower adjustably connected clamping plates, the upper end portions of said legs being clamped between said upper and lower plates, said plates having central openings, an internally threaded sleeve journalled for rotation in said openings and having an upper flanged portion bearing upon the upper surface of said upper plate, a plurality of radially extending brace arms having outer ends fixed to said legs and disposed intermediate the ends of said legs, a bearing carried by the inner ends of said arms, a feed screw receivably engaging the internal threads of said sleeve and slidably and rotatably supported by said bearing, and a pressure member carried by said screw and disposed beneath said arms and said bearing for bearing against a tire supported on the floor and between the lower ends of said legs, and means for rotating said sleeve.

2. The combination of claim 1 wherein said pressure member includes a ring spaced inwardly of said legs.

WILLIAM G. WILLIAMS.
FRED T. WILLIAMS.

REFERENCES CITED

The following references are of record in the file of this patent:

UNITED STATES PATENTS

| Number | Name | Date |
| --- | --- | --- |
| 882,855 | Welch | Mar. 24, 1908 |
| 1,475,519 | Snider | Nov. 27, 1923 |
| 1,564,496 | Staugaard | Dec. 8, 1925 |
| 1,948,434 | Stafford et al. | Feb. 20, 1934 |
| 2,418,849 | Polt | Apr. 15, 1947 |
| 2,446,963 | Stolz | Aug. 10, 1948 |

FOREIGN PATENTS

| Number | Country | Date |
| --- | --- | --- |
| 720,878 | France | Dec. 12, 1931 |